(12) United States Patent
Yano et al.

(10) Patent No.: US 9,255,623 B2
(45) Date of Patent: Feb. 9, 2016

(54) ENGINE WITH INCLINED CYLINDER

(75) Inventors: Takahiro Yano, Kakogawa (JP); Michio Hirano, Akashi (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 276 days.

(21) Appl. No.: 13/221,240

(22) Filed: Aug. 30, 2011

(65) Prior Publication Data
US 2012/0055437 A1 Mar. 8, 2012

(30) Foreign Application Priority Data
Sep. 6, 2010 (JP) .............................. P2010-198941

(51) Int. Cl.
*F02B 75/06* (2006.01)
*F02B 75/00* (2006.01)
*F02B 33/20* (2006.01)
*F16F 15/26* (2006.01)
*F02B 75/16* (2006.01)

(52) U.S. Cl.
CPC ................ *F16F 15/265* (2013.01); *F02B 75/06* (2013.01); *F02B 75/16* (2013.01)

(58) Field of Classification Search
CPC .......... F02B 75/00; F02B 75/22; F02B 61/02; F02B 75/16; F02B 51/02; F02B 3/06; F02B 1/046
USPC .................................... 123/195 AC, 72, 192.2
See application file for complete search history.

(56) References Cited

U.S. PATENT DOCUMENTS

| | | | | |
|---|---|---|---|---|
| 4,532,897 A | * | 8/1985 | Mezger | 123/196 R |
| 5,078,105 A | * | 1/1992 | Ito et al. | 123/195 R |
| 5,636,608 A | * | 6/1997 | Shichinohe et al. | 123/197.1 |
| 6,397,810 B2 | * | 6/2002 | Ohyama et al. | 123/192.2 |
| 7,931,004 B2 | * | 4/2011 | Koyama et al. | 123/196 S |
| 2003/0110940 A1 | | 6/2003 | Endo et al. | |
| 2005/0014583 A1 | | 1/2005 | Morii et al. | |
| 2005/0205334 A1 | * | 9/2005 | Moriyama | 180/291 |

FOREIGN PATENT DOCUMENTS

| | | |
|---|---|---|
| EP | 1 065 359 | 1/2001 |
| JP | 53-136434 | 4/1977 |
| JP | 61-198510 | 12/1986 |
| JP | 5-87209 | 11/1993 |
| JP | 11-280488 | 10/1999 |
| JP | 11-303941 | 11/1999 |
| JP | 11-351108 | 12/1999 |
| JP | 2000-88057 | 3/2000 |
| JP | 2000-337164 | 12/2000 |
| JP | 2003-184522 | 7/2003 |
| JP | 2003-336791 | 11/2003 |
| JP | 2004-360520 | 12/2004 |
| JP | 2007-22150 | 2/2007 |

* cited by examiner

*Primary Examiner* — Lindsay Low
*Assistant Examiner* — Syed O Hasan
(74) *Attorney, Agent, or Firm* — Wenderoth, Lind & Ponack, L.L.P.

(57) ABSTRACT

An engine with an inclined cylinder, including a horizontally-disposed crankshaft, and two balancer shafts arranged in parallel to the crankshaft. A drive gear for driving the balancer shafts is provided on the crankshaft, and driven gears respectively meshed with the drive gear are provided on the balancer shafts. The two balancer shafts are divided into areas on both sides of a center line of the cylinder and into upper and lower regions relative to an axis of the crankshaft, and axes of the balancer shafts are arranged so as to be placed within a range of a diameter of the drive gear.

6 Claims, 18 Drawing Sheets

EXHIBIT I

EXHIBIT II

ENGINE WITH INCLINED CYLINDER

BACKGROUND OF THE INVENTION

1. Field of the Invention

The present invention relates to an engine with an inclined cylinder, particularly relates to an engine with the inclined cylinder and two balancer shafts.

2. Description of the Prior Art

In the engine, total height of the engine can be suppressed to be low by inclining and arranging the cylinder. In addition, by providing the two balancer shafts, inertia force generated by reciprocal motion of a piston and rotation of a crankshaft can be completely eliminated as far as possible, and vibration of the engine can be suppressed.

FIG. 21 shows an engine described in Japanese Patent Laid-Open Application No. 2000-88057. The engine has a single cylinder 100, and a center line C1 of the cylinder 100 is inclined by a fixed angle relative to a vertical line M intersecting with an axis O0 of a crankshaft 103. In a crankcase 101, the crankshaft 103 is substantially horizontally-disposed, and two balancer shafts 105, 106 are arranged substantially in parallel to the crankshaft 103. In the crankcase 101, a cam shaft 111 and a governor shaft 112 are also arranged, and the cam shaft 111 is arranged on the same axis O1 as the one balancer shaft 105.

The substantially entire one balancer shaft 105 including a weight portion 105a is arranged so as to be positioned on the side of the cylinder 100 relative to the entire crankshaft 103 (including journal portions, crank arms, a crank pin, and a weight portion). The substantially entire other balancer shaft 106 including a weight portion 106a and the like is arranged so as to be positioned on the opposite side of the cylinder 100 relative to the entire crankshaft 103.

The one balancer shaft 105 is interlocked and coupled to the crankshaft 103 via a chain transmission mechanism including a driven sprocket 115, a chain 116, and a drive sprocket 117, and rotated in the same direction as the rotation direction A1 of the crankshaft 103 at the same rotation speed. The other balancer shaft 106 is interlocked and coupled to the crankshaft 103 via a gear transmission mechanism including a driven gear 118 and a drive gear 119, and rotated in the opposite direction to the rotation direction A1 of the crankshaft 103 at the same rotation speed.

In the engine with the inclined cylinder shown in FIG. 21, total height of the engine can be lowered. However, size in the front and rear direction (arrow H) of the crankcase 101, that is, size in the horizontal direction orthogonal to the crankshaft 103 is elongated. Thus, enlargement of the entire engine cannot be avoided. Particularly, in order to accommodate the other balancer shaft 106 arranged on the opposite side of the cylinder 100 and the driven gear 118, a part 101a protruding into a large arc shape on the opposite side of the cylinder is formed in an end wall 101a of the crankcase 101, and the part is a cause for the enlargement of the engine.

An object of the present invention is to completely eliminate inertia force generated by reciprocal motion of a piston and rotation of a crankshaft as far as possible in an engine with an inclined cylinder by providing two balancer shafts, and suppress vibration of the engine. Further, another object of the invention is to, although the two balancer shafts are provided, decrease size in the horizontal direction (size in the front and rear direction) of a crankcase by devising arrangement of the two balancer shafts.

SUMMARY OF THE INVENTION

In order to solve the above problem, an engine according to the present invention is an engine with an inclined cylinder, comprising: a crankshaft disposed substantially horizontally; two balancer shafts arranged substantially in parallel to the crankshaft; a drive gear provided on the crankshaft; and two driven gears respectively provided on the balancer shafts and meshed with the drive gear, wherein the two balancer shafts are arranged and divided into areas on both sides of a center line of the cylinder and into upper and lower regions relative to an axis of the crankshaft, and axes of the balancer shafts are arranged so as to be placed substantially within a range of a diameter of the drive gear when seen from the upper side of the engine.

In the present invention, the following configurations are preferably adopted in the above configuration.

(a) The axes of the two balancer shafts are arranged so as to have a phase angle difference of substantially 180 degrees between the balancer shafts around the axis of the crankshaft.

(b) One arranged on the upper side of the two balancer shafts is a first balancer shaft and another arranged on the lower side is a second balancer shaft. An axis of the second balancer shaft is positioned on the same side of the cylinder relative to the axis of the crankshaft and an axis of the first balancer shaft arranged on the upper side is positioned on the opposite side of the cylinder relative to the crankshaft.

(c) An axis of a cam shaft for driving valves is positioned between the axis of the second balancer shaft arranged on the lower side and the cylinder. In this case, further preferably, a space for arrangement of an oil level sensor is ensured on the side opposite to the side where the cam shaft is arranged relative to the second balancer shaft on the lower side.

(d) A starter motor attachment portion having an attachment hole is formed in a crankcase end positioned on the opposite side of the cylinder relative to the first balancer shaft arranged on the upper side, and a positioning hole for a positioning pin is coaxially formed in the attachment hole.

(e) A pump drive gear meshed with a pump driven gear of an oil pump is secured to the second balancer shaft arranged on the lower side.

(f) A pump shaft of an oil pump is integrally connected to the second balancer shaft arranged on the lower side. Integral connection includes not only a structure in which the pump shaft is integrated with the second balancer shaft but also a structure in which the pump shaft is arranged on the same axis as the second balancer shaft and connected by a coupling mechanism.

(g) The oil pump is provided in a crankcase cover or a crankcase.

(1) According to the present invention, total height of the engine can be suppressed to be low by inclining the cylinder, and a vibration damper effect of the engine can be improved by arranging the two balancer shafts.

Further, even when the two balancer shafts are arranged, size in the horizontal direction (size in the horizontal direction orthogonal to the crankshaft) of the crankcase and the engine can be decreased.

(2) Since the driven gears of both the balancer shafts have the same diameter and the same number of teeth as the drive gear, the drive gear and the driven gears are easily manufactured and managed.

(3) According to the configuration (a), since the two balancer shafts are arranged so as to have a phase angle difference of 180 degrees between the balancer shafts around the axis of the crankshaft, efficiency in an assembling task of both the balancer shafts by a predetermined rotation angle can be improved, and the size of the crankcase can be further decreased. That is, on assembling the balancer shafts, the driven gears of both the balancer shafts and the drive gear of the crankshaft can be easily meshed with each other and assembled by a predetermined rotation angle.

(4) According to the configuration (b), since the axis of the second balancer shaft on the lower side is positioned on the side of the cylinder relative to the axis of the crankshaft, and the axis of the first balancer shaft on the upper side is positioned on the opposite side of the cylinder relative to the axis of the crankshaft, the size of the engine and the crankcase can be further decreased in the engine with the inclined cylinder.

(5) According to the configuration (c), since the space in the crankcase is effectively utilized, the cam shaft can be arranged compactly in the space. In addition, it becomes possible to decrease the size in the horizontal direction and easily ensure the space for the arrangement of the oil sensor.

(6) According to the configuration (d), since the starter motor attachment portion having the attachment hole and the positioning hole coaxial with the attachment hole is provided in the crankcase, the starter motor can be easily and precisely positioned and fixed at a predetermined position by utilizing the positioning hole and the attachment hole. Unlike a conventional example, there is no need for forming a large attachment wall for fitting and retaining the entire periphery of an outer peripheral surface of a main body part of the starter motor. Thus, weight and the size of the crankcase can be decreased. Particularly, in a case where an engine with an inclined cylinder with a specification that a starter motor is not attached is provided, a starter motor attachment portion does not disturb a decrease in size of the engine.

(7) According to the configuration (e), since the second balancer shaft arranged on the lower side is utilized as a drive source of the oil pump, a gear transmission mechanism can be compactly arranged between the second balancer shaft and the oil pump arranged in a lower part of the engine close to an oil reservoir in general.

(8) According to the configuration (f), since the pump shaft is integrally connected to the second balancer shaft arranged on the lower side, the number of parts for driving the oil pump can be reduced.

(9) According to the configuration (g), intake and discharge ports of the oil pump can be easily connected to the oil passage formed in the crankcase cover or the crankcase.

BRIEF DESCRIPTION OF THE DRAWINGS

The above and other objects, features and advantages of the present invention will be become more apparent from the following description taken in connection with the accompanying drawings, in which.

DETAILED DESCRIPTION OF THE PREFERRED EMBODIMENTS

First Embodiment of the Invention

FIGS. 1 to 17 show an engine with an inclined cylinder according to a first embodiment of the present invention. The embodiment of the present invention will be described based on these figures.

(Configuration of Entire Engine)

Figure 1:
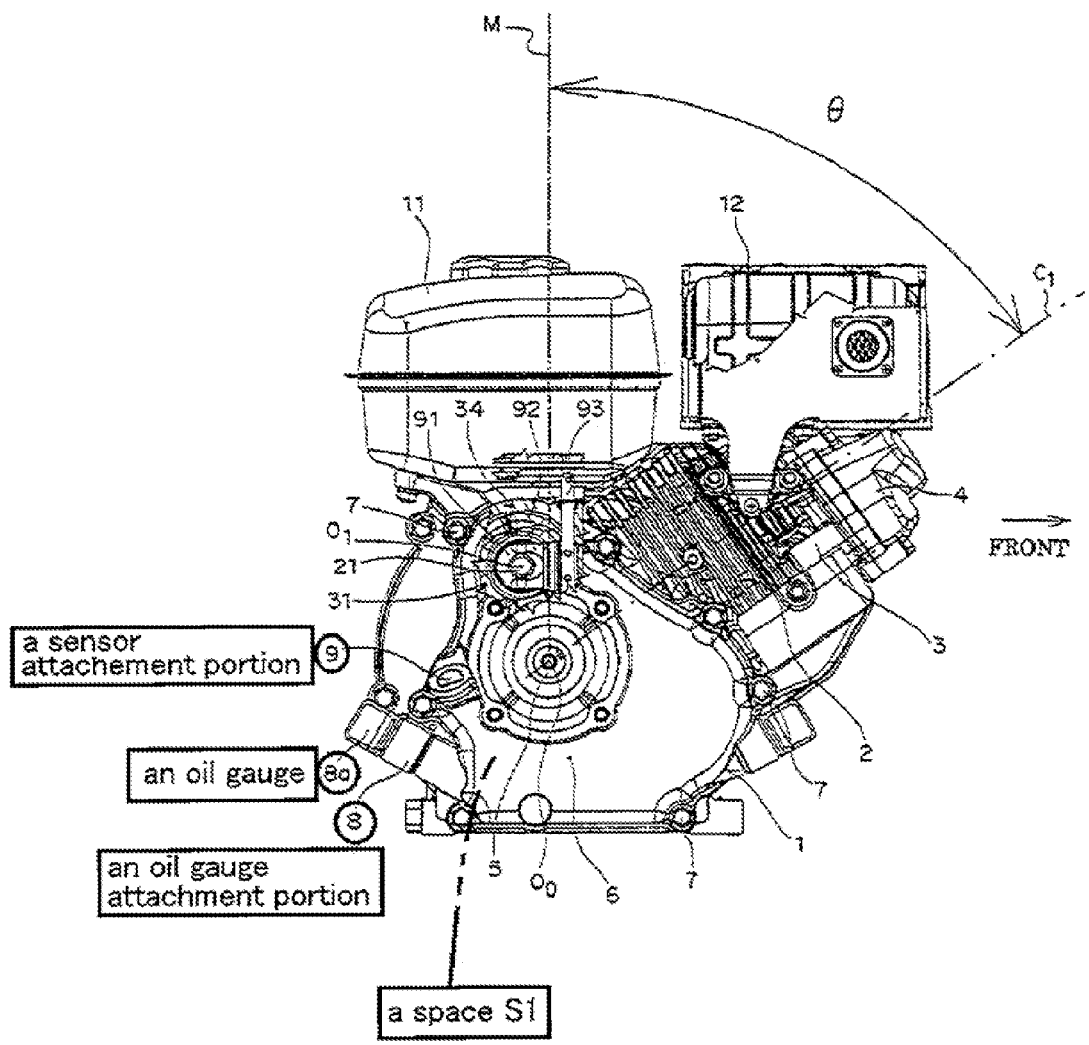
FIG. 1 is a side view showing an engine with an inclined cylinder according to a first embodiment of the present invention in which part of a crankcase cover is cut out.

FIG. 1 is a side view in which the engine with the inclined cylinder is seen in the axial direction of a crankshaft 5. For convenience of description, the side toward which a cylinder 2 is inclined in the horizontal direction orthogonal to the substantially horizontal crankshaft 5 is regarded as the "front side", and the axial direction of the crankshaft 5 seen from the rear side of the engine is regarded as the "lateral direction (right and left direction)" of the engine.

In FIG. 1, the cylinder 2 is formed on an upper surface in a front half part of a crankcase 1 integrally with the crankcase 1, and a cylinder head 3 and a head cover 4 are successively fastened to the cylinder 2. A center line C1 of the cylinder 2 is inclined toward the front side by a fixed angle θ (such as 55 to 60 degrees) relative to a vertical line M intersecting with an axis O0 of the crankshaft 5. A crankcase cover 6 is fastened onto a right end surface in the lateral direction (axial direction of the crankshaft 5) of the crankcase 1 by a plurality of bolts 7 (some of the bolts are given the reference numerals in the figure). A right end of the crankshaft 5 protrudes outward from the crankcase cover 6 as an output shaft part. A fuel tank 11 is arranged on the upper side of a rear half part of the crankcase 1, and an exhaust muffler 12 is arranged on the upper side of the cylinder head 3 and the head cover 4.

An oil gauge attachment portion 8 is opened in a lower rear end of the crankcase 1, and an oil gauge 8a is inserted from the oil gauge attachment portion 8 into the crankcase 1. Further, a sensor attachment portion (in a non-opened state) 9 into which an oil level sensor provided with a float can be inserted and fixed is formed on the upper side of the oil gauge attachment portion 8 as an option. In this sensor attachment portion 9, an opening is formed by mechanical processing or the like in a case where the oil level sensor is attached.

Figure 2:
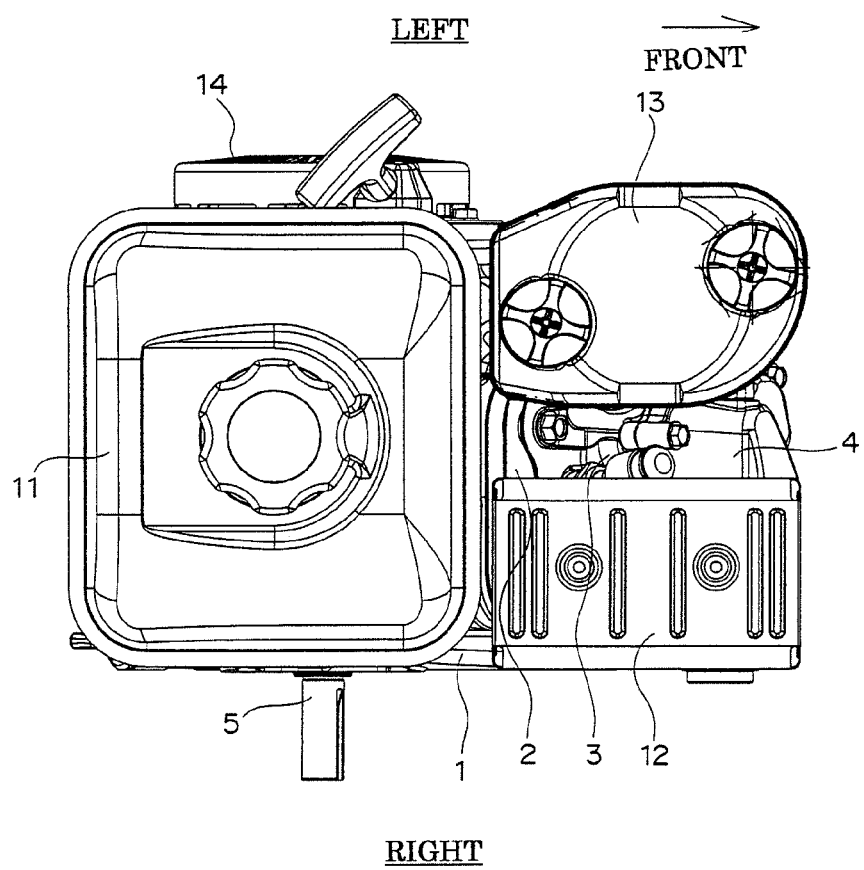
FIG. 2 is a plan view of the engine with the inclined cylinder of FIG. 1.

FIG. 2 is a plan view of FIG. 1, the fuel tank 11 is arranged on the upper side of the rear half part of the crankcase 1 and is formed into a substantially rectangular shape in plan view. The exhaust muffler 12 is arranged on the upper side of the cylinder head 3 and the head cover 4 in line with an air cleaner 13 in the lateral direction. For example, the exhaust muffler 12 is arranged on the right side and the air cleaner 13 is arranged on the left side. A recoil starter 14 is provided on the left side of the crankcase 1.

Figure 3:
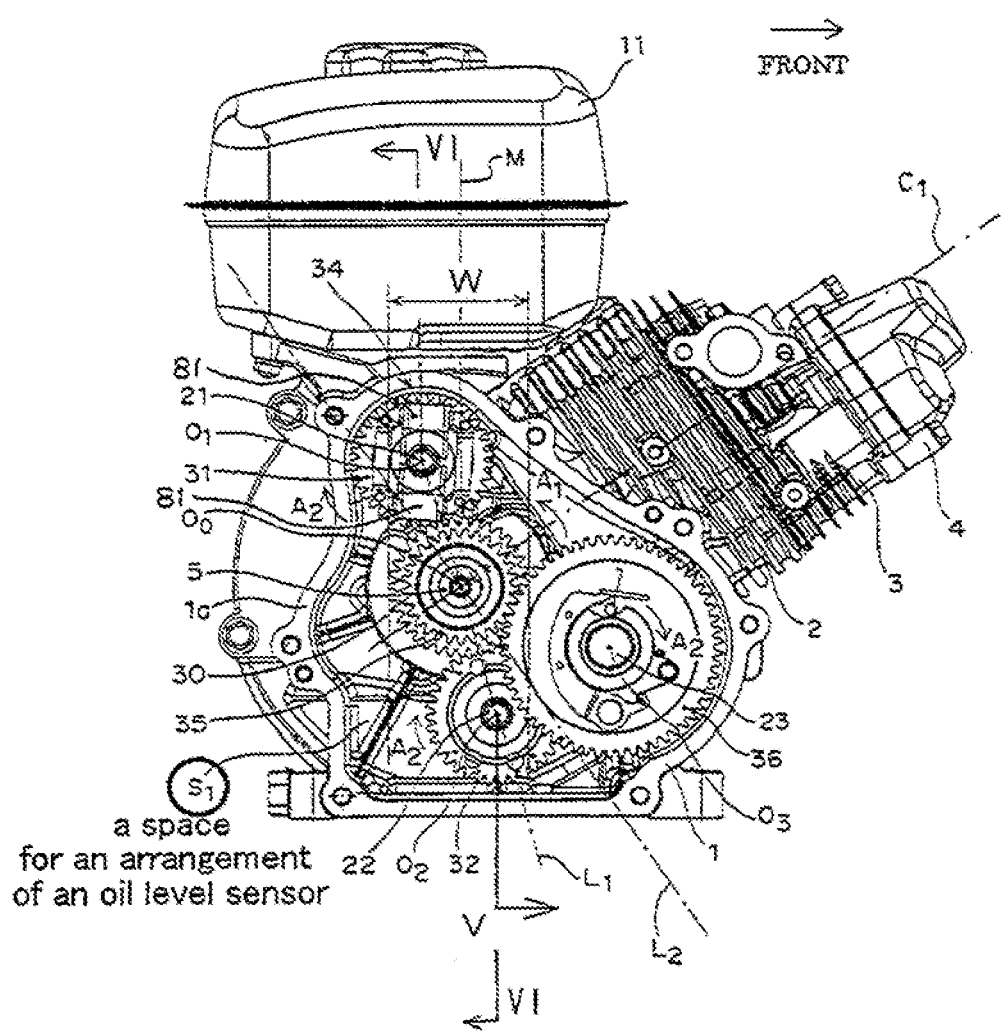
FIG. 3 is a side view showing the engine with the inclined cylinder of FIG. 1 in which the crankcase cover, an exhaust muffler, and an air cleaner are removed.

FIG. 3 is a side of the engine in which the crankcase cover 6, the exhaust muffler 12, and the air cleaner 13 of FIG. 1 are removed. In the crankcase 1, two first and second balancer shafts 21, 22 and a cam shaft 23 for driving intake and discharge valves are arranged substantially in parallel to the crankshaft 5.

A drive mechanism for the first and second balancer shafts 21, 22 includes one drive gear 30 secured to the crankshaft 5, and first and second driven gears 31, 32 respectively secured to the balancer shafts 21, 22 and meshed with the drive gear 30. The first and second driven gears 31, 32 have a gear structure of the same diameter and the same number of teeth as the drive gear 30. That is, by respectively transmitting mechanical force from the crankshaft 5 to the first and second balancer shafts 21, 22 via the drive gear 30 and the first and second driven gears 31, 32, the first and second balancer shafts 21, 22 are rotated in the opposite direction A2 to the rotation direction A1 of the crankshaft 5 at the same rotation speed as the crankshaft 5.

The first driven gear 31 also has a function as a governor gear.

Although described in detail later, a flyweight type governor mechanism 34 is installed onto an end surface of the first driven gear 31.

A drive mechanism of the cam shaft 23 includes a cam driven gear 35 secured to the crankshaft 5, and a cam driven gear 36 secured to the cam shaft 23 and meshed with the cam drive gear 35. The cam driven gear 36 has a diameter and the number of teeth which are twice more than the cam drive gear 35. That is, the cam shaft 23 is rotated in the opposite direction A2 to the rotation direction A1 of the crankshaft 5 at rotation speed which is half of the crankshaft 5.

(Layout of Both Balancer Shafts 21, 22 and Cam Shaft 23)

In the present embodiment, the first and second balancer shafts 21, 22 are arranged at positions regulated by the following items (a) to (e) when seen from the side of the engine, that is, seen in the axial direction of the crankshaft 5.

(a) In FIG. 3, an axis O1 of the first balancer shaft 21 (hereinafter, referred to as the "first balancer axis") and an axis O2 of the second balancer shaft 22 (hereinafter, referred to as the "second balancer axis") are arranged so as to be divided into both the sides of a center line C1 of the cylinder 2 (hereinafter, referred to as the "cylinder center line"). As a matter of course, since both the driven gears 31, 32 and the drive gear 30 have the same diameter and the same number of teeth, the first balancer axis O1 and the second balancer axis O2 are positioned at an equal distance away from the crankshaft axis O0.

(b) Both the balancer shafts 21, 22 are arranged in such a manner that the first balancer axis O1 is positioned on the upper side of the crankshaft axis O0 and the second balancer axis O2 is positioned on the lower side of the crankshaft axis O0.

(c) The first and second balancer shafts 21, 22 are arranged in such a manner that the first balancer axis O1 and the second balancer axis O2 have a phase angle difference of substantially 180 degrees between the balancer shafts 21,22 around the crankshaft axis O0. In other words, the crankshaft axis O0 and both the balancer axes O1, O2 are positioned on the same straight line L1 when seen in the axial direction of the crankshaft 5. In this case, the straight line L1 on which the three axes O0, O1, O2 are aligned is deviated from a straight line L2 intersecting with the crankshaft axis O0 by a fixed angle (such as 19 degrees) clockwise. The straight line L2 is orthogonal to the cylinder center line C1 of the cylinder 2. Thereby, the first balancer axis O1 on the upper side and the second balancer axis O2 on the lower side are set so as to come closer to the vertical line M intersecting with the crankshaft axis O0 in the front and rear direction.

(d) The first balancer axis O1 and the second balancer axis O2 are arranged within a diameter range (range in the front and rear direction) W of the drive gear 30 in the front and rear direction.

(e) The first balancer axis O1 on the upper side is positioned on the rear side of the vertical line M intersecting with the crankshaft axis O0 within the diameter range W of the drive gear 30, and the second balancer axis O2 on the lower side is positioned on the front side of the vertical line M intersecting with the crankshaft axis O0 within the diameter range W of the drive gear 30.

The cam shaft 23 is arranged in such a manner that an axis O3 thereof is positioned between the second balancer axis O2 on the lower side and a lower end of the cylinder 2.

As described above, by arranging the second balancer shaft 22 on the lower side in such a manner that the axis O2 thereof is placed on the front side of the crankshaft axis O0, a sufficiently wide space portion S1 for arrangement of the oil level sensor, the space portion being capable of accommodating the float of the oil level sensor and the like is ensured in the crankcase 1 on the rear side of the second balancer shaft 22.

Figure 5:
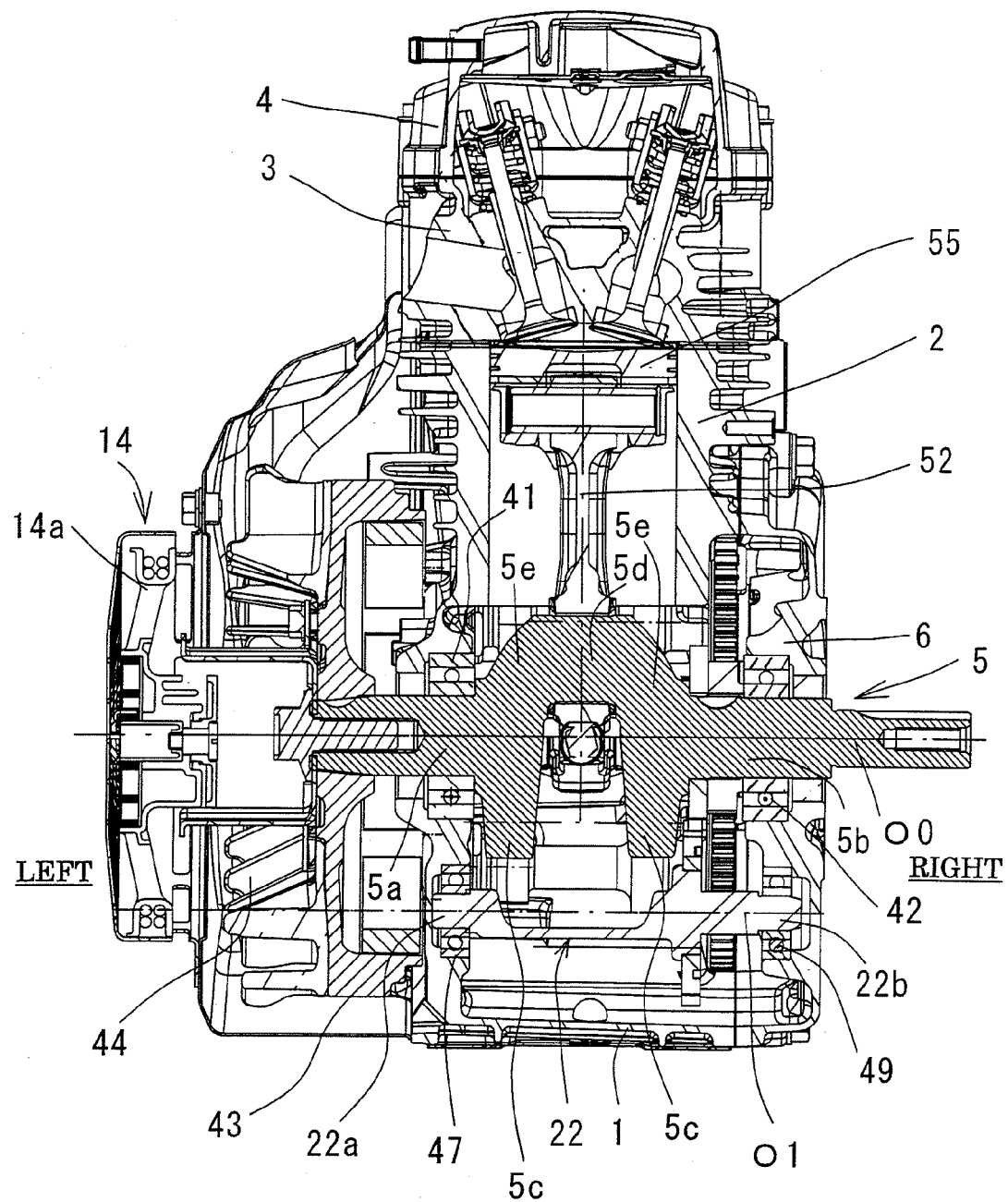
FIG. 5 is a sectional view taken along line V-V of FIG. 3.

FIG. 5 is a sectional view by the line V-V of FIG. 3. As already known, the crankshaft 5 includes left and right journal portions 5a, 5b, a pair of right and left crank arms 5e, and a crank pin 5d supported by both the crank arms 5e. The left journal portion 5a is rotatably supported on a left side wall of the crankcase 1 via a bearing 41, and the right journal portion 5b is rotatably supported on the crankcase cover 6 via a bearing 42. A flywheel 43, a cooling fan 44, and a pulley 14a of the recoil starter 14 are secured to a left end of the crankshaft 5. A recess portion for attachment of a ring gear 43a (refer to FIG. 17) for the starter is formed on an outer peripheral surface of the flywheel 43.

Figure 6:
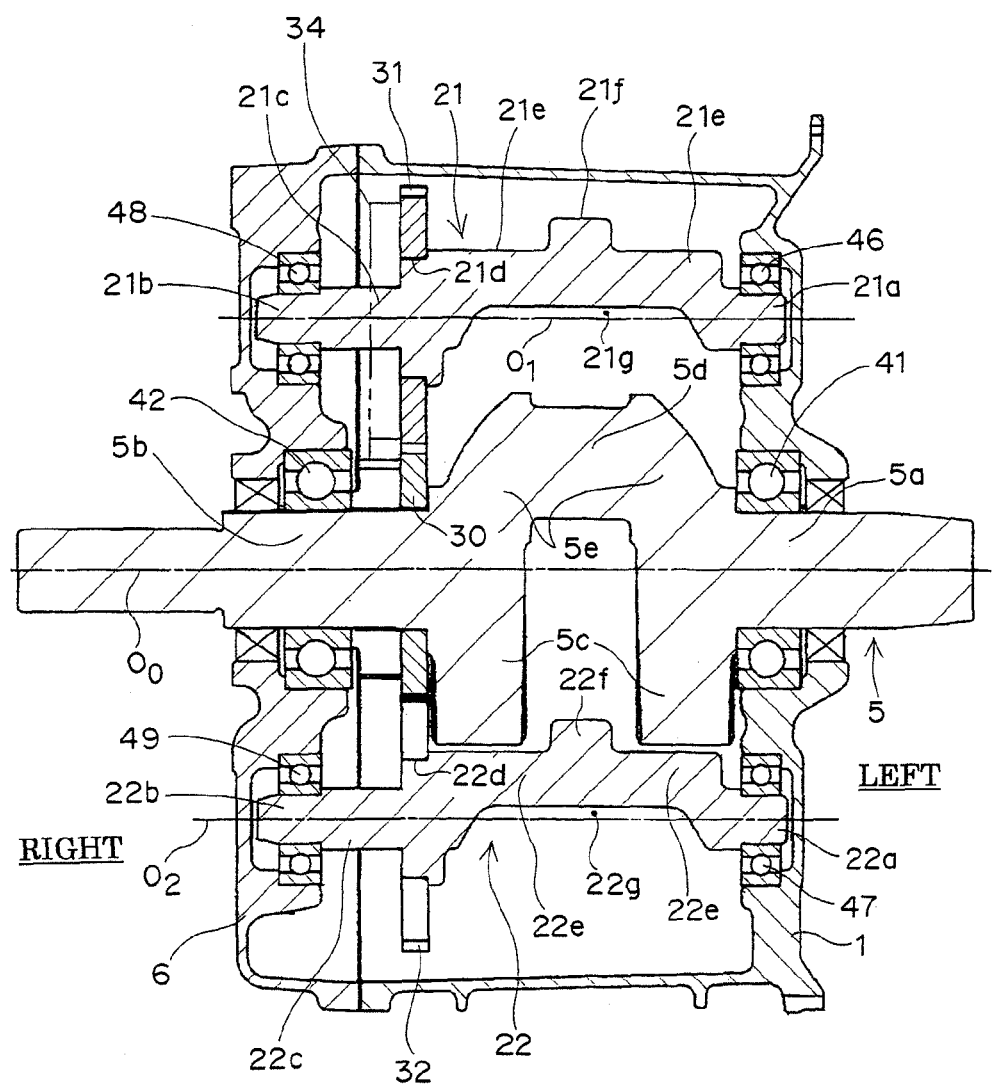
FIG. 6 is a sectional view taken along line VI-VI of FIG. 3 in which a governor mechanism is omitted.

FIG. 6 is a sectional view by the line VI-VI of FIG. 3 (view seen from the front side). Left journal portions 21a, 22a of the first and second balancer shafts 21, 22 are respectively rotatably supported on the left side wall of the crankcase 1 via bearings 46, 47, and right journal portions 21b, 22b are respectively rotatably supported on the crankcase cover 6 via bearings 48, 49.

(Shape of Balancer Shafts 21, 22)

Figure 13:
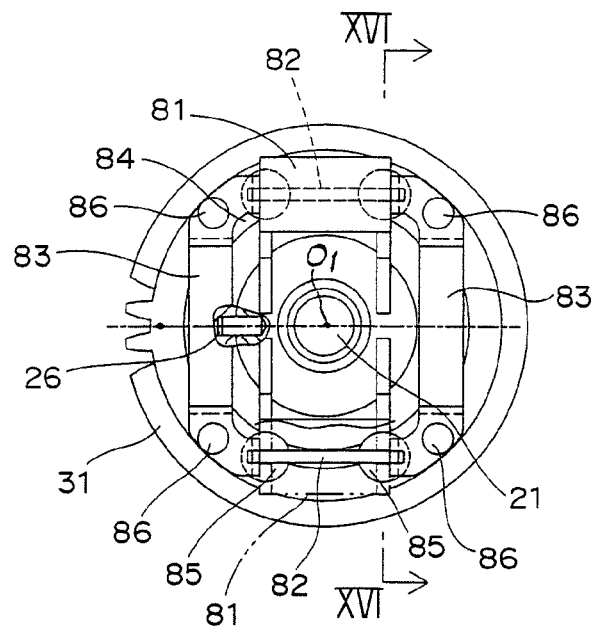
FIG. 13 is a XIII-arrow view of FIG. 12.

In FIG. 6, the first balancer shaft 21 and the second balancer shaft 22 are common parts or members having the same shape. Extended shaft portions 21c, 22c for governor arrangement are respectively formed on the left side of the right journal portions 21b, 22b, and the first and second driven gears 31, 32 are respectively fitted to annular gear attachment surfaces 21d, 22d formed on the left side of the extended shaft portions 21c, 22c. As shown in FIG. 13, the first driven gear 31 is positioned and fixed by a positioning pin 26 in the rotation direction by a predetermined rotation angle relative to the first balancer shaft 21. The second driven gear 32 of FIG. 6 is similarly positioned.

Figure 10:
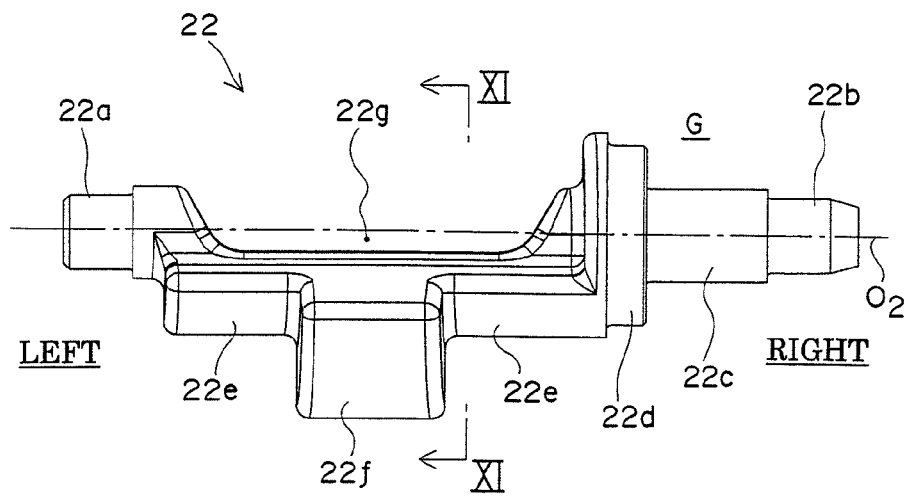
FIG. 10 is a front view of a second balancer shaft.

FIG. 10 is a front view of the second balancer shaft 22 arranged on the lower side. As described above, the second balancer shaft 22 includes the left and right journal portions 22a, 22b, the extended shaft portion 22c, and the annular gear attachment surface 22d, and also integrally includes a first step weight portion 22e formed into a crank shape between this gear attachment surface 22d and the left journal portion 22a, and a second step weight portion 22f formed on an outer peripheral surface in a laterally center part of the first step weight portion 22e.

The first step weight portion 22e is formed into a crank shape, so as to have gravity center deviated (eccentrically-placed) in one direction in the radial direction from the second balancer axis O2, and to have a recess portion 22g recessed on the opposite side of the deviation direction, which is on the side of the second balancer axis O2. The second step weight portion 22f further protrudes in the same direction as the deviation direction of the first step weight portion 22e from the outer peripheral surface of the first step weight portion 22e.

Figure 11:
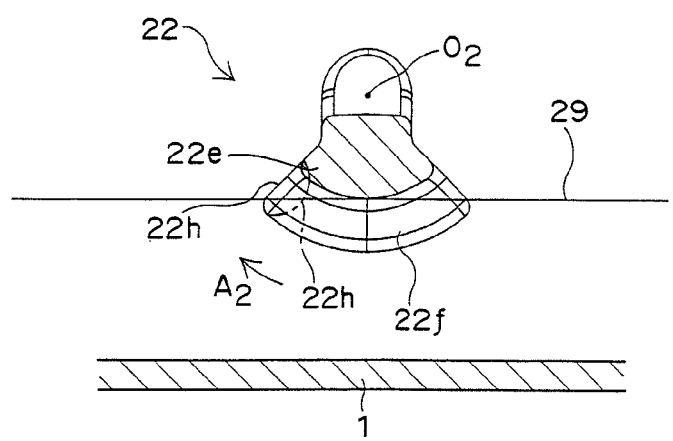
FIG. 11 is a sectional view taken along line XI-XI of FIG. 10.

FIG. 11 is a sectional view by the line XI-XI of FIG. 10. The first step weight portion 22e is formed into a sector or fan shape taking the second balancer axis O2 as a sector pivot when seen in the axial direction, and an open angle (center angle) thereof is for example substantially 90 degrees.

The second step weight portion 22f is also formed into a sector or fan shape taking the second balancer axis O2 as a sector pivot when seen in the axial direction, and an open angle thereof is 90 degrees which is the same as the first step weight portion 22e.

The vicinity of an outer end in the radial direction of the sector shape second step weight portion 22f is for example soaked into an oil reservoir 29 in the crankcase 1. Thereby, an end surface 22h on the side of the rotation direction A2 of the second step weight portion 22f functions as an oil pull-up surface. It should be noted that in order to improve the function as the oil pull-up surface 22h, the end surface 22h can be formed into an arc recess shape as shown by an imaginary line so as to improve oil pull-up efficiency.

Figure 12:
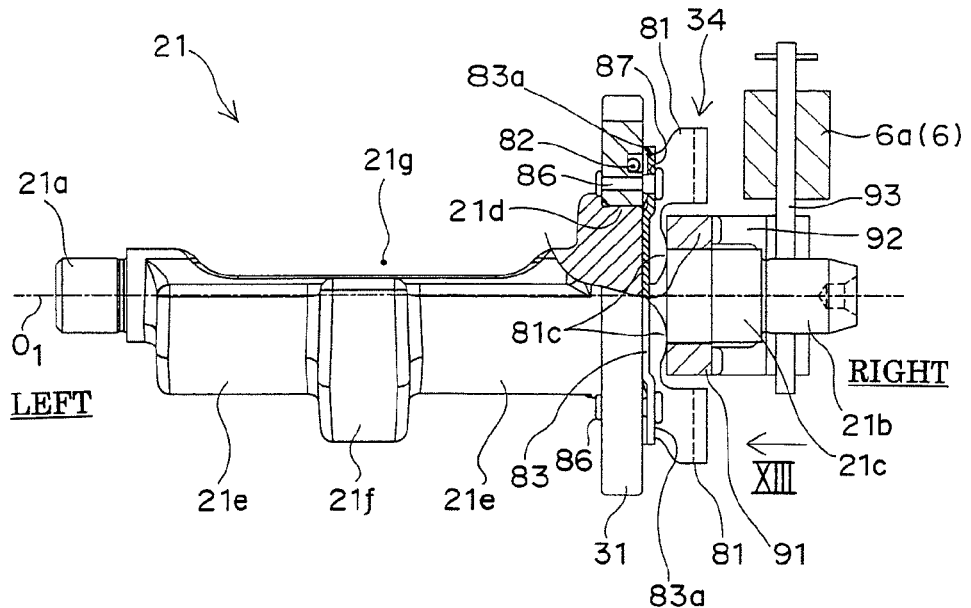
FIG. 12 is a partially sectional front view of a first balancer shaft provided with the governor mechanism.

FIG. 12 is a partially sectional front view showing the first balancer shaft 21 arranged on the upper side. The common parts having the same shape as the second balancer shaft 22 are used as described above. That is, the first balancer shaft 21 integrally includes the left and right journal portions 21a, 21b, the extended shaft portion 21c for the governor arrangement formed on the left side of the right journal portion 21b, the annular gear attachment surface 21d formed on the left side of the extended shaft portion 21c, a first step weight portion 21e having a sector shape section, the first step weight portion 21e being formed into a crank shape between this gear attachment surface 21d and the left journal portion 21a, a second step weight portion 21f having a sector shape section, the second step weight portion 21f being formed on an outer peripheral surface in a laterally center part of the first step weight portion 21e, and a recess portion 21g.

Figure 7:
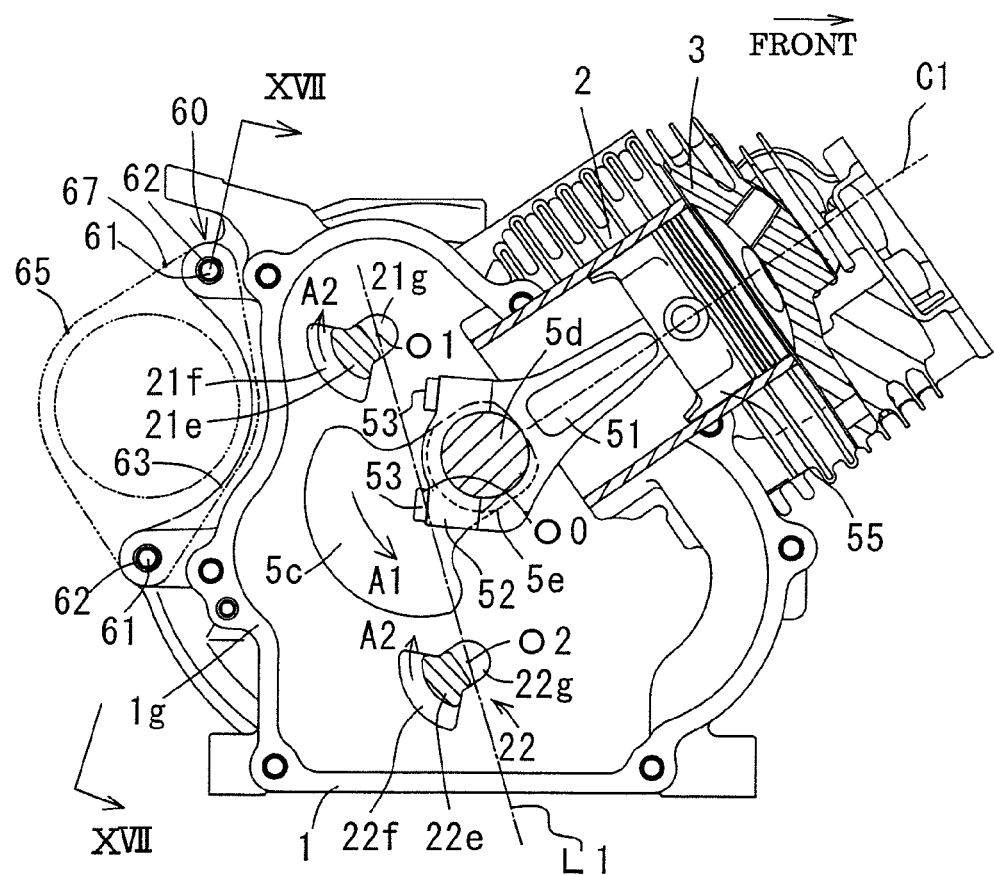
FIG. 7 is a schematic vertically-sectional view of the engine with the inclined cylinder of FIG. 1 showing a relationship between rotation positions of a crankshaft and both balancer shafts at the time of a piston top dead center.

FIG. 7 shows a positional relationship between a weight portion 5c of the crankshaft 5 and the weight portions 21e, 21f, 22e, 22f of both the balancer shafts 21, 22 at the time of a top dead center of a piston 55. The weight portion 5c of the crankshaft 5 is directed on the direct opposite side of the cylinder 2 as already known. The first and second step weight portions 21e, 21f, 22e, 22f of both the balancer shafts 21, 22 are directed substantially in parallel to and in the same direction as the weight portion 5c of the crankshaft 5. Taking such a positional relationship as a premise, size in the radial direction of the first and second step weight portions 21e, 21f, 22e, 22f of the first and second balancer shafts 21, 22 and size in the radial direction (depth) of the recess portions 21g, 22g are set as follows so as to be placed within such a range that the first and second balancer shafts 21, 22 are not brought into contact with the weight portion 5c of the crankshaft 5, a main bearing cap 52 of a connecting rod 51, and a cap bolt 53 thereof during an engine operation.

Figure 8:
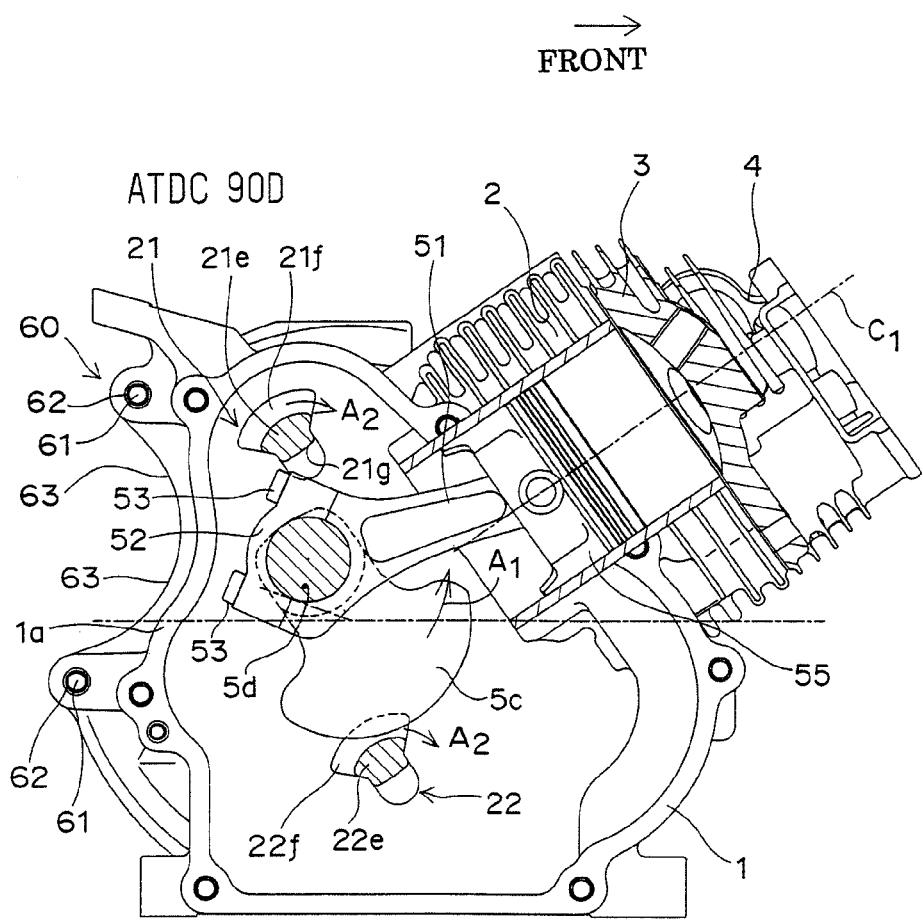
FIG. 8 is a schematic vertically-sectional view of the engine with the inclined cylinder of FIG. 1 showing a relationship between rotation positions of the crankshaft and both the balancer shafts when the crankshaft and both the balancer shafts are rotated by substantially 90 degrees from the piston top dead center.

FIG. 8 shows a state that the crankshaft 5 and both the balancer shafts 21, 22 are rotated by substantially 90 degrees of a crank angle from the top dead center of the piston 55. The weight portion 5c of the crankshaft 5 is moved by substantially 90 degrees in the arrow A1 direction, whereas the first and second step weight portions 21e, 21f, 22e, 22f of the balancer shaft 21, 22 are moved by substantially 90 degrees in the opposite direction A2 to the rotation direction A1 of the crankshaft 5. At this time, the main bearing cap 52 and the cap bolt 53 are brought close to the first balancer shaft 21 on the upper side. However, the depth of the recess portion 21g of the first balancer shaft 21 is set in such a manner that the main bearing cap 52 and the cap bolt 53 are not brought into contact with the first balancer shaft 21. That is, the depth of the recess portion 21g is set in such a manner that the main bearing cap 52 and the cap bolt 53 pass through a space of the recess portion 21g.

Regarding the second balancer shaft 22, the second step weight portion 22f thereof is overlapped with the weight portion 5c of the crankshaft 5 when seen in the axial direction. However, as in FIG. 6, the second step weight portion 22f is arranged in a space of the weight portion 5c (between the crank arms 5e) of the crankshaft 5 and formed with narrower width than the space of the weight portion 5c. Thereby, the second step weight portion 22f comes into the space of the weight portion 5c of the crankshaft 5, and the weight portion 5c of the crankshaft 5 and the second step weight portion 22f of the second balancer shaft 22 are not brought into contact with each other.

A radius of a sector shape of the first step weight portion 22e of the second balancer shaft 22 is set in such a manner that an outer peripheral surface of the first step weight portion 22e can be brought close to an outer peripheral surface of the weight portion 5c of the crankshaft 5 as far as possible while not being brought into contact with the outer peripheral surface.

Figure 9:
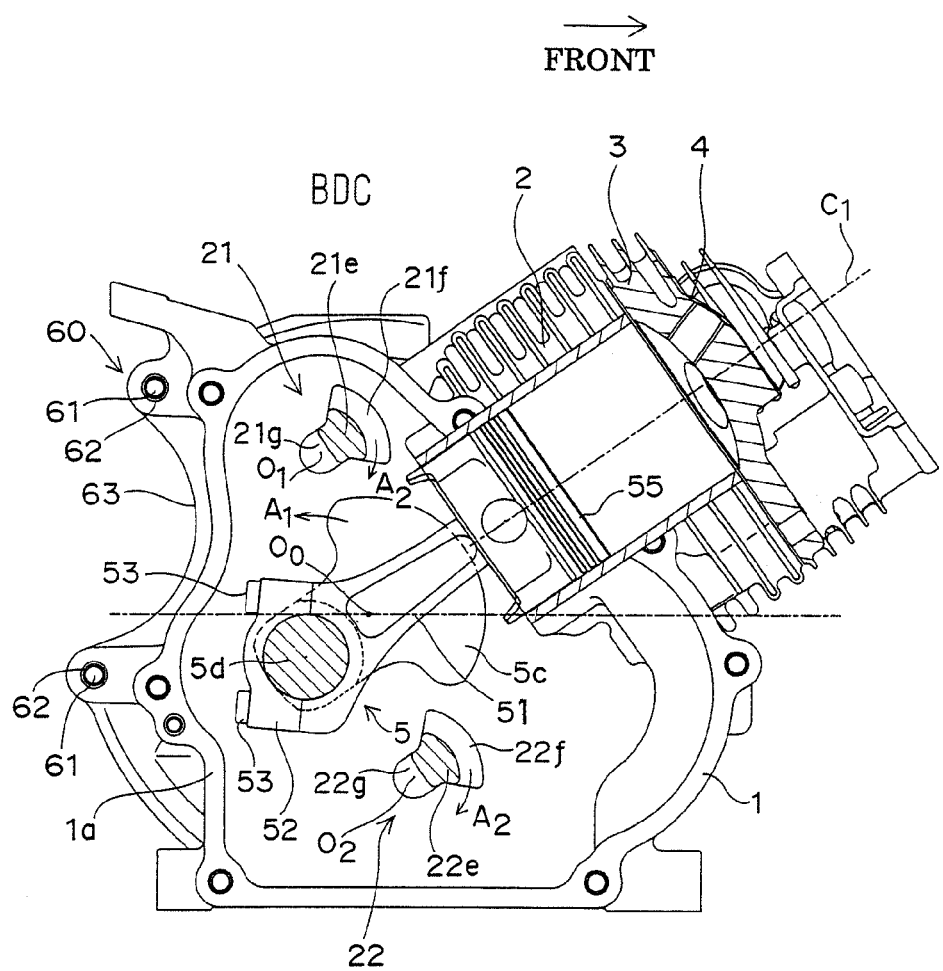
FIG. 9 is a schematic vertically-sectional view of the engine with the inclined cylinder of FIG. 1 showing a relationship between rotation positions of the crankshaft and both the balancer shafts at the time of a piston bottom dead center.

FIG. 9 shows a state of a bottom dead center of the piston 55. The weight portion 5c of the crankshaft 5 is directed to the cylinder 2, and the first and second step weight portions 21e, 21f, 22e, 22f of both the balancer shafts 21, 22 are also directed in parallel to and in the same direction as the weight portion 5c of the crankshaft 5.

It should be noted that when the crankshaft 5 and both the balancer shafts 21, 22 are further rotated by substantially 90 degrees of the crank angle from the bottom dead center of the piston 55 of FIG. 9, the positional relationship between the first and second step weight portions 21e, 21f, 22e, 22f of the balancer shafts 21, 22 and the weight portion 5c of the crankshaft 5 is opposite to a case of FIG. 8. Namely, in a state that the crankshaft 5 further rotates by substantially 90 degrees from the state of FIG. 9, the second step weight portion 21f of the first balancer shaft 21 is inserted in the space of the weight portion 5c of the crankshaft 5, whereas the main bearing cap 52 and the cap bolt 53 pass through a space of the recess portion 22g of the second balancer shaft 22.

As described above, the shape and the size of the first and second balancer shafts 21, 22 are determined in such a manner that the balancer shafts 21,22 are not brought into contact with the crankshaft 5, the weight portion 5c thereof, the main bearing cap 52, the cap bolt 53, and the like. As a matter of course, weight and the like thereof are basically determined so as to eliminate unbalances due to inertia force and the like of the piston 55.

(Attachment Structure of Starter Motor)

In the engine with the inclined cylinder of the present embodiment, as shown in FIG. 7, a starter motor attachment portion 60 is formed on a rear wall 1a of the crankcase 1 integrally with the crankcase 1 in such a manner that the engine can also be manufactured with a specification that a starter motor is provided.

The starter motor attachment portion 60 is formed so as to protrude rearward from the rear wall 1a of the crankcase 1, and a pair of female screw holes (attachment holes) 61 is formed so as to be spaced from each other substantially in the up and down direction, and an arc shape recess portion 63 recessed on the front side is formed between the upper and lower female screw holes 61 in order to decrease the size in the front and rear direction of the crankcase 1 and to stabilize an attachment state of a starter motor 65.

Figure 17:
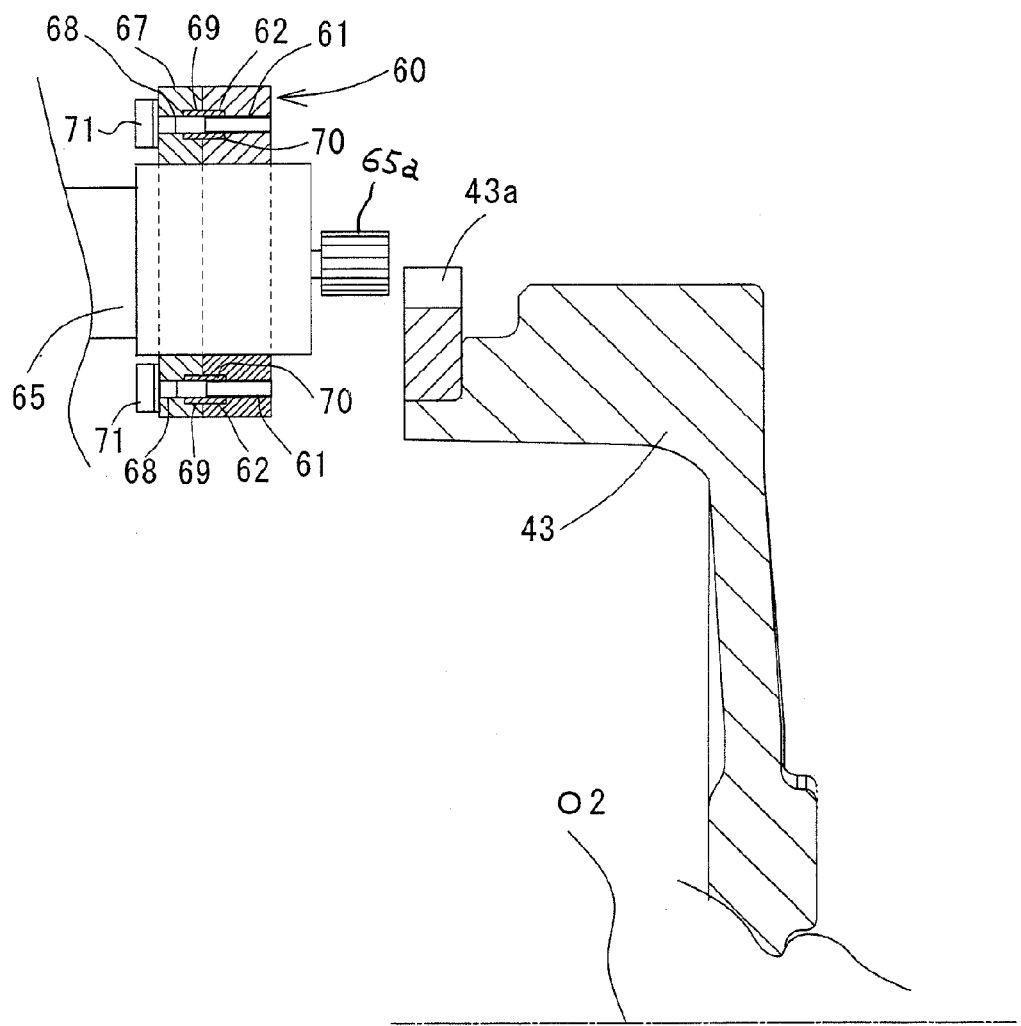
FIG. 17 is an enlarged sectional view showing a section by the line XVII-XVII of FIG. 7 in which a starter motor is attached.

FIG. 17 is a view corresponding to a section by the line XVII-XVII of FIG. 7, the view showing a state that the starter motor 65 is attached. A plural of positioning holes 62 is respectively formed in the female screw holes 61 coaxially with the female screw holes 61. Each of the positioning holes 62 has a larger inner diameter than an inner diameter of the female screw hole 61. Meanwhile, a plural of in bolt insertion holes 68 is formed in a flange portion 67 of the starter motor 65, and a plural of positioning holes 69 having a larger diameter than an inner diameter of the bolt insertion holes 68 is respectively formed in the bolt insertion holes 68. A diameter of the positioning hole 69 is the same as the diameter of the positioning hole 62 of the starter motor attachment portion 60. The positioning holes 68 are formed coaxially with the bolt insertion holes 68. That is, by fitting tubular positioning pins 70 into both the positioning holes 62, 69, the starter motor 65 is positioned in the direction substantially orthogonal to the crankshaft 5, and a pinion gear 65a of the starter motor 65 is positioned relative to the ring gear 43a of the flywheel 43. It should be noted that although a Bendix type (inertia slide type) of pinion gear is utilized as the pinion gear 65a, a so-called shift type pinion gear can also be utilized.

In a case where the starter motor 65 is attached, as shown by imaginary lines in FIG. 7, an outer peripheral surface of the starter motor 65 is matched with the arc shape recess portion 63, and as in FIG. 17, the flange portion 67 of the starter motor 65 is overlapped with the starter motor attachment portion 60. At this time, by fitting the tubular positioning pins 70 into both the positioning holes 62, 69, the starter motor 65 is positioned. By screwing bolts 71 inserted into the bolt insertion holes 68 and the tubular positioning pins 70 into the female screw holes 61 of the starter motor attachment portion 60, the starter motor 65 is fixed at a predetermined position.

(Structure of Governor)

Figure 14:
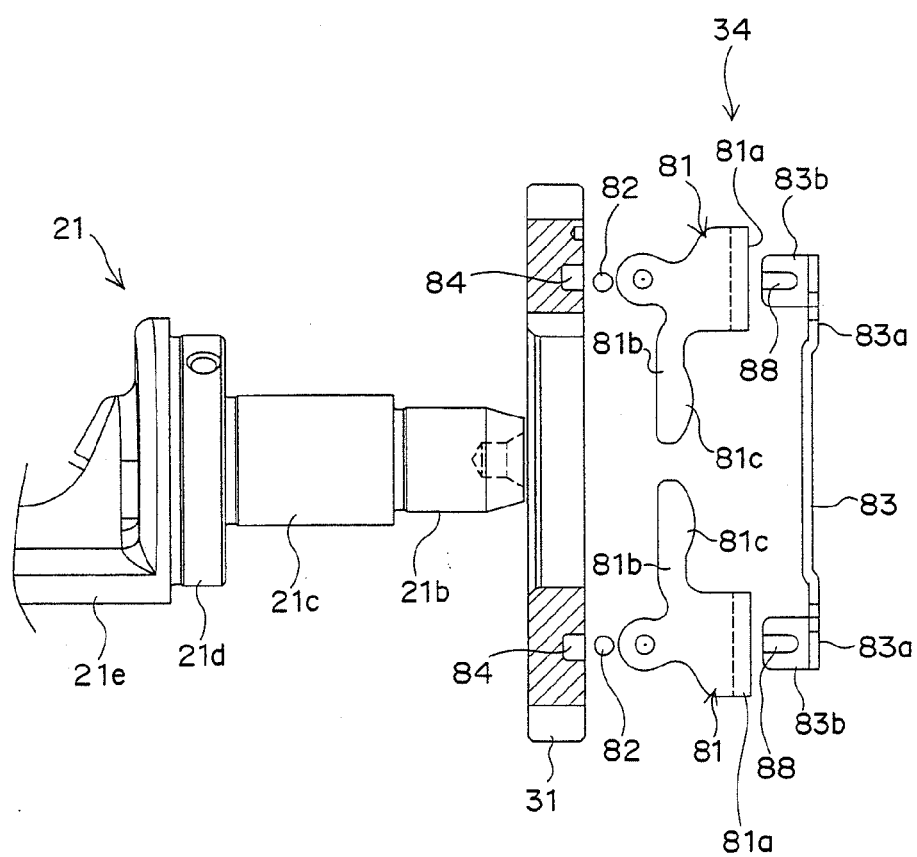
FIG. 14 is an enlarged front view showing part of FIG. 12 in which the governor mechanism is exploded.
Figure 15:
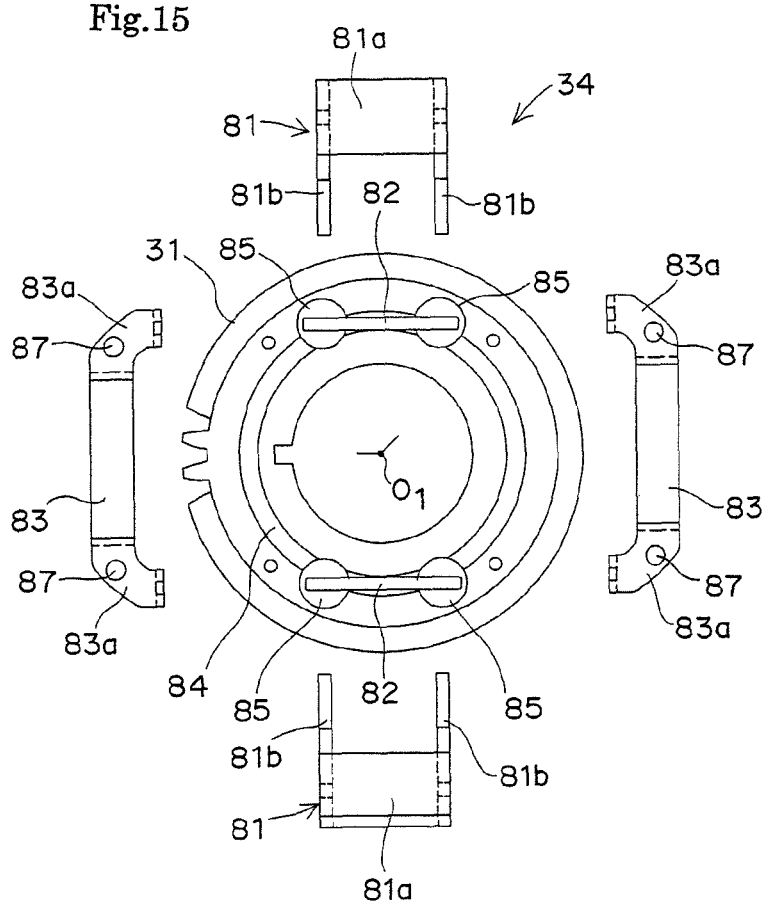
FIG. 15 is a XIII arrow view corresponding to FIG. 13 in which the governor mechanism is exploded.
Figure 16:
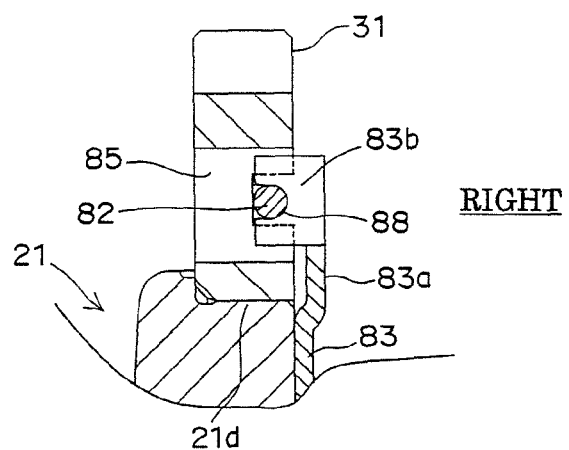
FIG. 16 is an enlarged sectional view showing part of a section by the line XVI-XVI of FIG. 13.

With FIGS. 12 to 15, a structure of the governor mechanism 34 arranged on the one end surface of the driven gear 31 of the first balancer shaft 21 will be described. FIG. 13 is a XIII-arrow view of FIG. 12, FIG. 14 is an exploded front view of the governor mechanism 34, FIG. 15 is an exploded side view in which the governor mechanism 34 is seen in the axial direction, and FIG. 16 is an enlarged sectional view showing part of a section by the line XVI-XVI of FIG. 13. In FIG. 14, this governor mechanism 34 includes a pair of flyweights 81, a pair of support pins 82 respectively pivotally supporting the flyweights 81, and a pair of holding members (holders) 83 fixing both the support pins 82. Both the support pins 82 are arranged in a recess portion 84 formed on the end surface of the first driven gear 31.

In FIG. 15, the recess portion 84 is formed into an annular shape taking the first balancer axis O1 as center, and both the support pins 82 are arranged substantially in parallel to each other, and arranged at symmetrical positions to each other with respect to the first balancer axis O1. Through holes 85 are formed in points where the support pins 82 are arranged. For more detail, the four through holes 85 are formed at points corresponding to both ends in the longitudinal direction of the support pins 82. Both the ends of the support pins 82 come into the through holes 85 from the recess portion 84.

Each of the flyweights 81 is made of sheet metal and includes a rectangular weight portion 81a, and a pair of arm portions 81b formed by bending both ends of the weight portion 81a. Base ends (ends on the side of the first balancer axis O1) of both the arm portions 81b are inserted into parts of the through holes 85 and pivotally supported on the support pins 82.

The pair of holding members 83 are also made of sheet metal, and elongated in the direction orthogonal to the support pins 82, and both ends 83a in the longitudinal direction are inclined into a dogleg shape. Further, as shown in FIG. 16, a bent portion 83b bent on the side of the first driven gear 31 is integrally formed in a front end of each of the ends 83a. A U-shaped groove 88 is formed in this bent portion 83b, and by fitting this U-shaped groove 88 to the support pin 82, the support pin 82 is fixed to the recess portion 84.

As shown in FIG. 15, rivet insertion holes 87 are formed in the ends 83a of the holding members 83 respectively. As shown in FIG. 12, the holding member 83 is fixed to the end surface of the first driven gear 31 by a rivet 86 inserted into the rivet insertion hole 87.

It should be noted that both the ends 83a of the holding member 83 are formed into stepwise shape via a step part and displaced so as to be away from the end surface of the driven gear 31

In addition to the flyweights 81, the holding members 83, and the like, the governor mechanism 34 includes a cylindrical or disc shape governor sleeve 91 fitted to the extended shaft portion 21c movably in the axial direction, a bifurcated pivot arm 92 abutted with a right end surface of this governor sleeve 91, and an arm shaft 93 to which this pivot arm 92 is secured. A left end surface of the governor sleeve 91 is abutted with action portions 81c of the flyweights 81. When the flyweights 81 are opened on the support pins 82 by rotation of the first balancer shaft 21, the governor sleeve 91 is pushed by the action portions 81c and moved rightward. The arm shaft 93 extends substantially vertically upward, is rotatably supported on a boss portion 6a formed in the crankcase cover 6, and further protrudes upward from the boss portion 6a.

Figure 4:
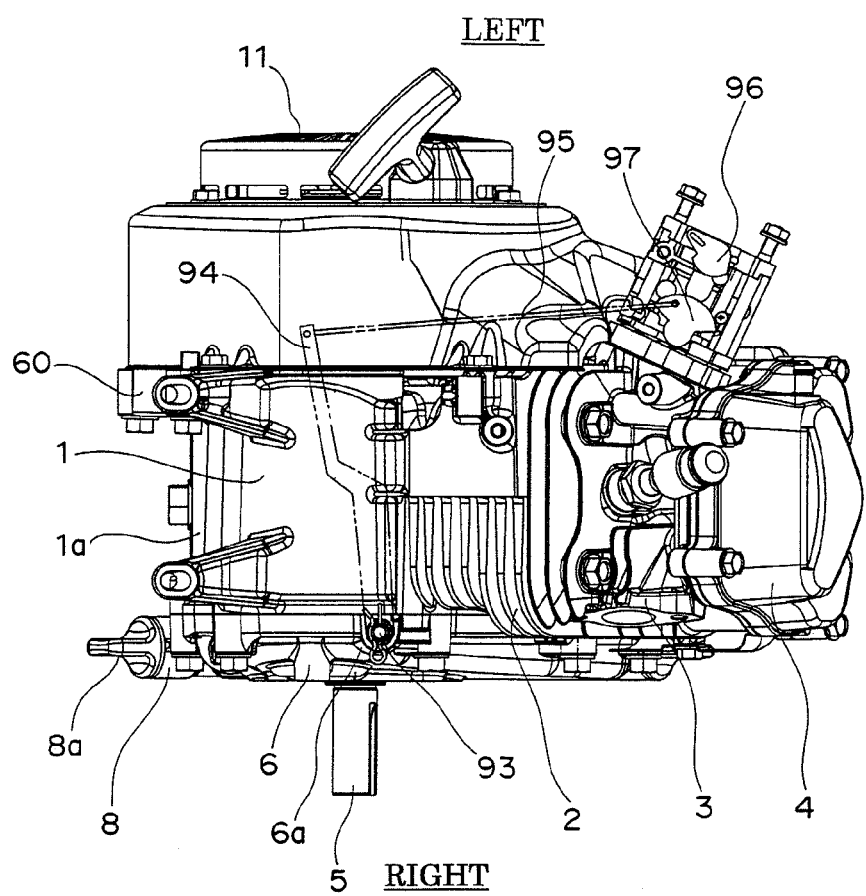
FIG. 4 is a plan view showing the engine with the inclined cylinder of FIG. 1 in which the crankcase cover, the exhaust muffler, the air cleaner, and a fuel tank are removed.

In FIG. 4, an operation arm 94 extending leftward on the upper side of the crankcase 1 as shown by imaginary lines is secured to an upper end of the arm shaft 93, and a left end of this operation arm 94 is coupled to a fuel adjustment lever 97 of a carburetor (or a throttle body) 96 via a coupling rod 95.

Operations and Effects of the Embodiment (1) When the engine is started by the recoil starter 14 shown in FIG. 2 or the starter motor 65 shown in FIG. 7, the crankshaft 5 is rotated in the arrow A1 direction and both the balancer shafts 21, 22 are rotated in the opposite direction A2 at the same rotation speed as the crankshaft 5 in FIG. 7. Inertia force generated by reciprocal motion of the piston 55 and rotation of the crankshaft 5 is eliminated by the weight portion 5c of the crankshaft 5 and the first and second step weight portions 21e, 21f, 22e, 22f of both the balancer shafts 21, 22. Thereby, vibration of the engine is suppressed.

(2) With the engine according to the present embodiment, total height of the engine can be suppressed to be low by inclining the cylinder 2 as in FIG. 3. Although the engine is a single-cylinder engine, by providing the two balancer shafts 21, 22, a vibration damper effect of the engine can be improved without enlarging the balancer shafts 21, 22. Furthermore, the two first and second balancer shafts 21, 22 are arranged substantially at an immediately above position and an immediately below position in the vicinity of the crankshaft 5. Specifically, the axes O1, O2 of the first and second balancer shafts 21, 22 on the upper and lower sides are arranged within the range in the front and rear direction (diameter range) W of the drive gear 30. Thus, although the two first and second balancer shafts 21, 22 are provided, the size in the front and rear direction of the crankcase 1 can be decreased.

(3) As shown in FIG. 3, since both the driven gears 31, 32 of the first and second balancer shafts 21, 22 have the same diameter and the same number of teeth as the drive gear 30, the driven gears 31, 32 and the drive gear 30 are easily manufactured and managed.

(4) As shown in FIG. 3, since the axes O1, O2 of the first and second balancer shafts 21, 22 are arranged so as to have the phase angle difference of 180 degrees around the axis O0 of the crankshaft 5, efficiency in an assembling task of the first and second balancer shafts 21, 22 by a predetermined rotation angle can be improved, and the size of the crankcase 1 can be further decreased. That is, on assembling the first and second balancer shafts 21, 22, meshing marks of the driven gears 31, 32 of the first and second balancer shafts 21, 22 and the drive gear 30 of the crankshaft 5 can be easily matched with each other. Thus, both the balancer shafts 21, 22 can be easily set and assembled to a predetermined rotation angle relative to a rotation angle of the crankshaft and assembled.

(5) As shown in FIG. 3, in the engine with the inclined cylinder 2, the axis O2 of the second balancer shaft 22 on the lower side is positioned on the side of the cylinder relative to the axis O0 of the crankshaft 5, and the axis O1 of the first balancer shaft 21 on the upper side is positioned on the opposite side of the cylinder relative to the axis O0 of the crankshaft 5. Thus, the size in the front and rear direction of the crankcase 1 and the engine can be further decreased.

(6) As shown in FIG. 3, the cam shaft 23 can be arranged compactly by effectively utilizing a space between the lower end of the inclined cylinder 2 and the second balancer shaft 22 on the lower side.

(7) As shown in FIG. 3, the axis O2 of the second balancer shaft 22 on the lower side is arranged on the front side of (the cylinder side relative to) the axis O0 of the crankshaft 5. Thus, the size in the front and rear direction of the crankcase 1 is decreased, and the space S1 for the arrangement of the oil level sensor can be easily ensured on the rear side of the second balancer shaft 22 on the lower side.

(8) As shown in FIG. 7, the starter motor attachment portion 60 having the arc shape recess portion 63 recessed on the front side is formed on the rear wall 1a of the crankcase 1, as shown in FIG. 17, the female screw holes 61 coaxially having the positioning holes 62 are formed in the starter motor attachment portion 60, and the attachment bolts 71 for attachment of the starter motor and the tubular positioning pins 70 are coaxially arranged so as to position and fix the starter motor 65. Thus, unlike a conventional example, there is no need for forming a large attachment wall for fitting and retaining the entire periphery of an outer peripheral surface of a main body part of the starter motor. Therefore, weight and the size of the crankcase 1 can be decreased. Particularly, in a case where an engine with an inclined cylinder with a specification that a starter motor is not attached is provided, the starter motor attachment portion 60 does not largely protrude rearward as in FIG. 7. Thus, the size of the engine can be decreased.

Figure 18:
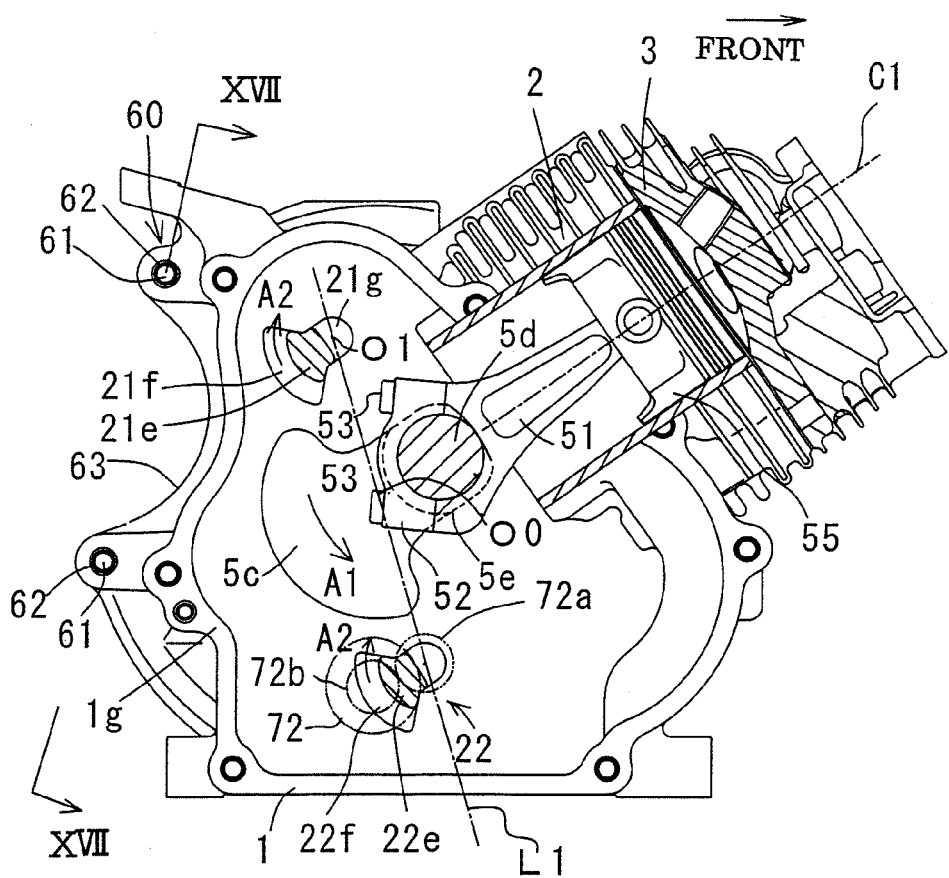
FIG. 18 is a schematic vertically-sectional view of a second embodiment of the present invention showing the engine with the inclined cylinder similar to FIG. 7.

Other Embodiments (1) FIG. 18 shows an engine with an inclined cylinder according to a second embodiment of the present invention. In a case where the engine is enlarged, instead of the oil pull-up function of utilizing the second balancer shaft 22 on the lower side, or in addition to the oil pull-up function, there is a need for providing an oil pump. The engine shown in FIG. 18 includes an oil pump 72 in the crankcase 1, includes a pump drive gear 72a and a pump driven gear 72b. The pump drive gear 72a meshed with the pump driven gear 72b of the oil pump 72 is formed in the second balancer shaft 22 on the lower side. Thereby, in a lower part of the crankcase 1, the oil pump 72 can be driven by a simple transmission mechanism. Although the oil pump 72 is arranged on the rear side of the balancer shaft 22 on the lower side when seen from the side in FIG. 18, the oil pump 72 may be arranged on the front side or the lower side of the balancer shaft 22 on the lower side.

It should be noted that as a mechanical power transmission mechanism between the second balancer shaft 22 and a pump shaft, a mechanism other than the above gear type transmission mechanism may be adopted.

Figure 19:
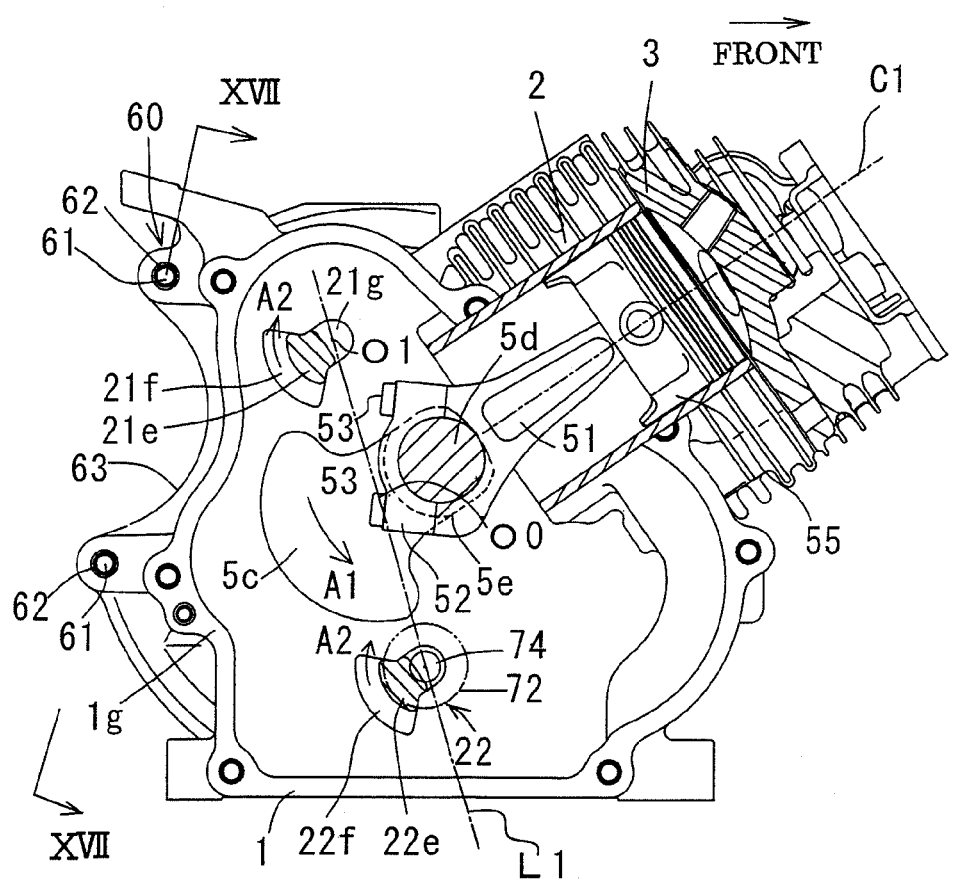
FIG. 19 is a schematic vertically-sectional view of a third embodiment of the present invention showing the engine with the inclined cylinder similar to FIG. 7.

(2) FIG. 19 shows an engine with an inclined cylinder according to a third embodiment of the present invention. Although the engine includes the oil pump 72 as well as the second embodiment, a pump shaft 74 of the oil pump 72 is arranged coaxially with the second balancer shaft 22 on the lower side, and integrally connected not by the gear transmission mechanism but by a coupling mechanism.

Figure 20:
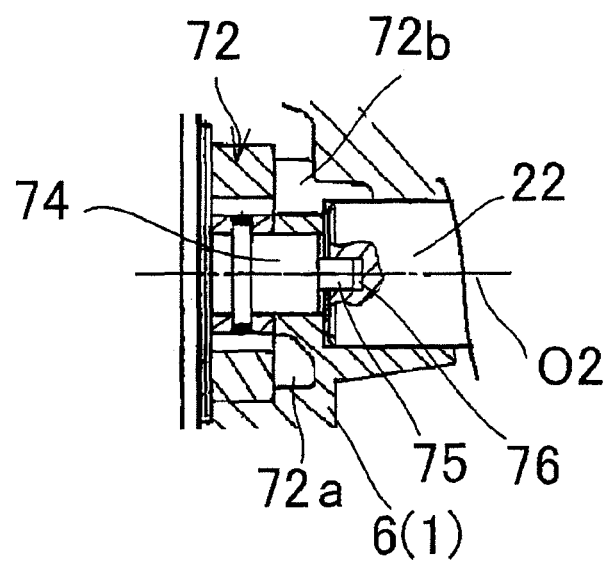
FIG. 20 is a sectional view of an oil pump part in the third embodiment.
Figure 21:
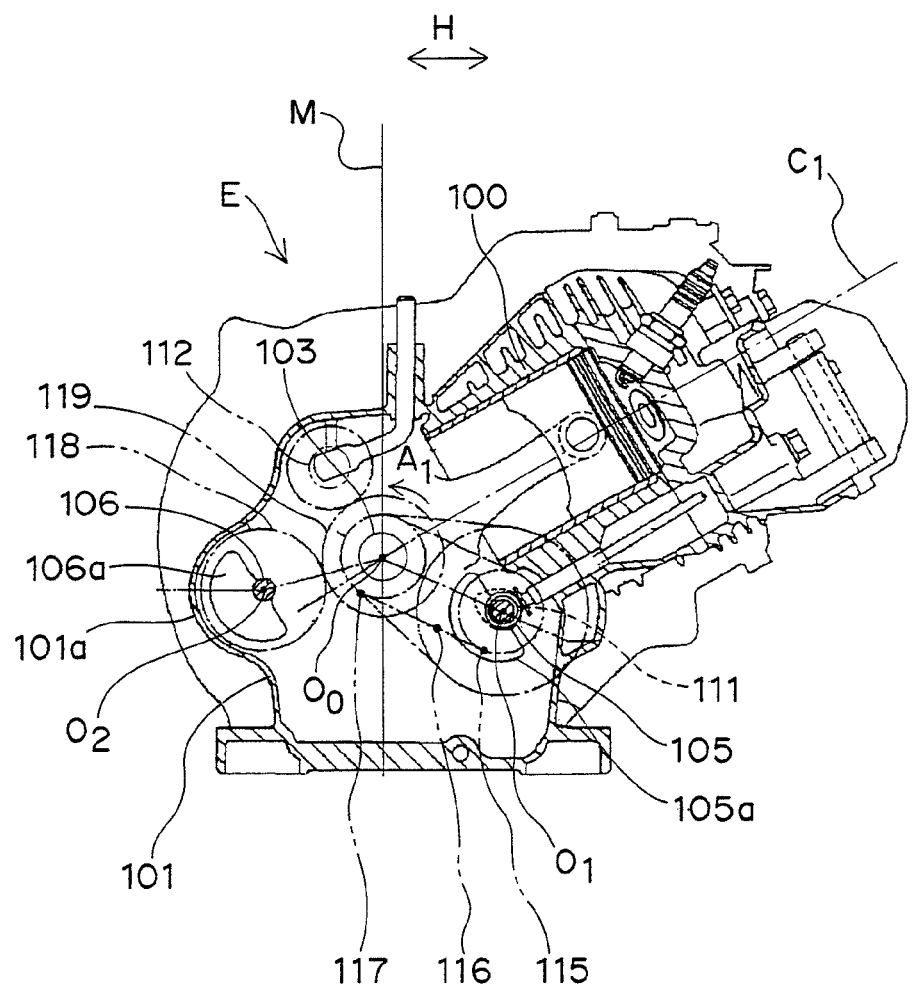
FIG. 21 is a vertically-sectional view of a conventional example.

FIG. 20 is a sectional view of the oil pump (trochoid pump) 72 of FIG. 19 in which an axis of the pump shaft 74 is set on the same straight line as the axis O2 of the second balancer shaft 22 on the lower side. The coupling mechanism is formed by a projection 75 formed on an end surface of the pump shaft 74, the projection extending in the radial direction, and a radial groove 76 formed on an end surface of the second balancer shaft 22 and meshed with the projection 75. A so-called Oldham's coupling mechanism is provided.

In the oil pump 72, a pump casing part is formed integrally with the crankcase cover 6 (or the crankcase 1), and an intake port and a discharge port of the oil pump 72 respectively communicate with an oil intake passage 72a and an oil supply passage 72b formed in a wall of the crankcase cover 6.

According to the third embodiment, since there is no need for the gear transmission mechanism, the number of parts for driving the pump can be reduced.

It should be noted that as a structure in which the pump shaft 74 is integrally connected to the balancer shaft 22, the pump shaft 74 may be integrated with the second balancer shaft 22.

(3) Although the present invention is suitable for a single-cylinder engine, the present invention may also be applied to a multi-cylinder engine.

(4) The present invention can be variously modified and changed without departing from the spirit and the scope of the present invention described in the claims.

(5) The present invention is not limited to the structures of the above embodiments but includes various modified examples obtained within a range not departing from contents described in the claims.

What is claimed is:

1. An engine comprising:
   a crankcase;
   an inclined cylinder having a center line inclined relative to a vertical line;
   a crankshaft disposed substantially horizontally in the crankcase;
   a first balancer shaft arranged substantially in parallel to the crankshaft in the crankcase;
   a second balancer shaft arranged substantially in parallel to the crankshaft in the crankcase;
   a drive gear for the first and second balancer shafts, the drive gear being secured to the crankshaft;
   a first driven gear secured to the first balancer shaft;
   a second driven gear secured to the second balancer shaft, the first and second driven gears being meshed with the drive gear; and
   a cam shaft for driving valves positioned between the second balancer shaft and the cylinder, wherein:
   the crankcase is provided with a horizontal bottom surface and a starter motor attachment portion having an attachment hole for a starter motor;
   a fuel tank is directly fixed on an upper portion of on the crankcase;
   a cylinder head and a head cover are fastened to the cylinder;
   an exhaust muffler and an air cleaner are arranged on an upper side of the cylinder head and the head cover so as to be arranged in line with each other in the lateral direction;
   the first and second balancer shafts are arranged and divided into areas on opposite sides of the center line of the cylinder and into upper and lower regions relative to an axis of the crankshaft;
   axes of the first and second balancer shafts are arranged so as to be substantially within a range of a diameter of the drive gear and within a range of the fuel tank in a horizontal direction perpendicular to the axis of the crankshaft;
   the axes of the first and second balancer shafts are arranged so as to have a phase angle difference of substantially 180 degrees between the first and second balancer shafts around the axis of the crankshaft;
   the first balancer shaft is arranged above the second balancer shaft;
   the axis of the second balancer shaft is positioned on the same side of the cylinder relative to the axis of the crankshaft;
   the axis of the first balancer shaft is positioned on the opposite side of the cylinder relative to the axis of the crankshaft;
   an oil gauge is disposed on an opposite side of the cam shaft relative to the second shaft in the crankcase;
   the starter motor attachment portion is formed in an end wall of the crankcase positioned on an opposite side of the cylinder relative to the first balancer shaft, and the starter motor attachment portion is provided with an arc shape recess portion recessed on the cylinder side;
   a starter motor is fit in the arc shape recess portion of the starter motor attachment portion,
   the starter motor is positioned under the fuel tank, and positioned on the opposite side of the cylinder relative to the first balancer shaft; and
   the oil gauge is positioned under the fuel tank and the starter motor.

2. The engine with the inclined cylinder according to claim 1, wherein a positioning hole for a positioning pin is coaxially formed in the attachment hole.

3. The engine with the inclined cylinder according to claim 1, further comprising:
   a pump drive gear meshed with a pump driven gear of an oil pump, the pump drive gear being secured to the second balancer shaft.

4. The engine with the inclined cylinder according to claim 1, further comprising:
   a pump shaft of an oil pump, the pump shaft being integrally connected to the second balancer shaft.

5. The engine with the inclined cylinder according to claim 3, wherein the oil pump is provided in a crankcase cover or a crankcase.

6. The engine with the inclined cylinder according to claim 1, wherein the fuel tank is disposed on an upper side of a rear part of the crankcase.

* * * * *